United States Patent
Ciccarelli et al.

(10) Patent No.: US 6,359,940 B1
(45) Date of Patent: Mar. 19, 2002

(54) METHOD AND APPARATUS FOR DOWNCONVERTING SIGNALS TRANSMITTED USING A PLURALITY OF MODULATION FORMATS TO A COMMON INTERMEDIATE FREQUENCY RANGE

(75) Inventors: Steven C. Ciccarelli, Temecula; Saed G. Younis, San Diego, both of CA (US)

(73) Assignee: Qualcomm Incorporated, San Diego, CA (US)

(*) Notice: Subject to any disclaimer, the term of this patent is extended or adjusted under 35 U.S.C. 154(b) by 0 days.

(21) Appl. No.: 09/259,242

(22) Filed: Feb. 26, 1999

Related U.S. Application Data

(60) Provisional application No. 60/076,520, filed on Mar. 2, 1998.

(51) Int. Cl.[7] .............................................. H04L 27/10
(52) U.S. Cl. ..................... 375/316; 375/316; 375/324; 375/335; 375/340; 455/188.1; 455/189.1; 455/190.1; 455/196.1
(58) Field of Search ................................ 375/271, 275, 375/316, 324, 340, 335, 322, 140, 141, 150, 152; 455/188.1, 189.1, 190.1, 191.1, 191.3, 192.1, 192.2, 193.1, 196.1

(56) References Cited

U.S. PATENT DOCUMENTS

| | | | | |
|---|---|---|---|---|
| 5,291,516 A | * | 3/1994 | Dixon et al. .................... | 375/1 |
| 5,347,546 A | * | 9/1994 | Abadi et al. .................. | 375/75 |
| 5,446,422 A | * | 8/1995 | Mattila et al. ............... | 332/103 |
| 5,471,652 A | * | 11/1995 | Hulkko .......................... | 455/76 |
| 5,475,391 A | * | 12/1995 | Spencer ........................ | 342/62 |
| 5,483,686 A | * | 1/1996 | Saka et al. ............... | 455/182.2 |
| 5,982,819 A | * | 11/1999 | Wamack et al. ............ | 375/316 |
| 6,069,923 A | * | 5/2000 | Ostman et al. ............. | 375/316 |
| 6,072,996 A | * | 6/2000 | Smith ..................... | 455/189.1 |

FOREIGN PATENT DOCUMENTS

| | | | | |
|---|---|---|---|---|
| EP | 0793356 | 1/1997 | ............ | H04B/1/40 |
| EP | 0823790 | 8/1997 | ............ | H04B/1/40 |
| WO | 9730523 | 8/1997 | ............ | H04B/1/40 |
| WO | 9800927 | 1/1998 | ............ | H04B/1/40 |

\* cited by examiner

Primary Examiner—Stephen Chin
Assistant Examiner—Dac V. Ha
(74) Attorney, Agent, or Firm—Philip Wadsworth; Charles D. Brown; Bruce W. Greenwalls

(57) ABSTRACT

A receiver that downconverts input signals modulated using first, second, third and fourth modulation formats to a common intermediate frequency range. The first and second modulation formats are transmitted to the receiver in a first frequency range, the third modulation format is transmitted to the receiver in a second frequency range, and the fourth modulation format is transmitted to the receiver in a third frequency range. The input signals are provided to first, second and third band selection filters that respectively select first, second and third frequency ranges. A first downconverter is coupled to an output of the first band selection filter, and downconverts signals from the first frequency range to the common intermediate frequency range. A second downconverter is selectively coupled by a switch to either an output of the second band selection filter or an output of the third band selection filter, and downconverts signals from either the second frequency range or the third frequency range to the common intermediate frequency range. The second downconverter has an input coupled to a frequency doubling circuit. Switching circuitry selectively couples one of either a first oscillating signal from a voltage controlled oscillator (VCO) having a VCO frequency range or a second oscillating signal at a second frequency that is outside the VCO frequency range to an input of the first downconverter and an input of the frequency doubling circuit.

44 Claims, 6 Drawing Sheets

METHOD AND APPARATUS FOR DOWNCONVERTING SIGNALS TRANSMITTED USING A PLURALITY OF MODULATION FORMATS TO A COMMON INTERMEDIATE FREQUENCY RANGE

This application claims benefit of Provisional No. 60/076,520, filed Mar. 2, 1998.

BACKGROUND OF THE INVENTION

I. Field of the Invention

The present invention relates generally to mobile radio communication systems. More particularly, the present invention relates to mobile radio units that can receive and demodulate signals at different frequency bands that have been modulated in accordance with multiple modulation formats. Even more particularly, the present invention relates to a novel and improved receiver circuit that downconverts such signals at different frequency bands to a common frequency band using a minimal number of hardware components.

II. Description of the Prior Art

Currently, mobile radio telephones typically support communications in a number of different modes corresponding to different modulation formats. For example, there are so-called "dual-mode" mobile radio telephones that support communications using both analog and code division multiple access (CMDA) signals. As the number of modes that the phone supports increases, the circuitry required in the phone for downconverting and sampling the input signals typically increases in complexity. This occurs because, in multi-mode phones, the input signals are received at different frequency bands depending on the operating mode, and downconverting and sampling the signals from each of the frequency bands typically requires separate circuitry for each band. It would therefore be desirable to have a receiver design that could be used in multi-mode phones for downconverting and sampling the input signals which used common hardware for the downconversion and sampling operations, thereby minimizing the hardware components required for operation of a multi-mode phone.

SUMMARY OF THE INVENTION

There present invention is directed to a receiver that downconverts input signals modulated using first, second, third and fourth modulation formats to a common intermediate frequency range. The first and second modulation formats are transmitted to the receiver in a first frequency range, the third modulation format is transmitted to the receiver in a second frequency range, and the fourth modulation format is transmitted to the receiver in a third frequency range. The input signals are provided to first, second and third band selection filters that respectively select first, second and third frequency ranges. A first downconverter is coupled to an output of the first band selection filter, and downconverts signals from the first frequency range to the common intermediate frequency range. A second downconverter is selectively coupled by a switch to either an output of the second band selection filter or an output of the third band selection filter, and downconverts signals from either the second frequency range or the third frequency range to the common intermediate frequency range. The second downconverter has an input coupled to a frequency doubling circuit. Switching circuitry selectively couples one of either a first oscillating signal from a voltage controlled oscillator (VCO) having a VCO frequency range or a second oscillating signal at a second frequency that is outside the VCO frequency range to an input of the first downconverter and an input of the frequency doubling circuit In a preferred embodiment, the VCO is responsive to control circuitry and selectively generates the first oscillating signal at a channel frequency associated with the first modulation format, and the first downconverter mixes the output of the first band selection filter with the first oscillating signal at the channel frequency associated with the first modulation format in order to downconvert signals modulated in accordance with the first modulation format from the first frequency range to the common intermediate frequency range. The VCO further selectively generates the first oscillating signal at a channel frequency associated with the second modulation format, and the first downconverter mixes the output of the first band selection filter with the first oscillating signal at the channel frequency associated with the second modulation format in order to downconvert signals modulated in accordance with the second modulation format from the first frequency range to the common intermediate frequency range. In addition, in the preferred embodiment, the VCO further selectively generates the first oscillating signal at a channel frequency associated with the third modulation format, and the first oscillating signal at the channel frequency associated with the third modulation format is provided to the frequency doubling circuit. The second downconverter then mixes the output of the second band selection filter with an output of the frequency doubling circuit when the first oscillating signal at a channel frequency associated with the third modulation format is provided to the frequency doubling circuit in order to downconvert signals modulated in accordance with the third modulation format from the second frequency range to the common intermediate frequency range.

The receiver of the present invention also preferably includes a mixer that forms the second oscillating signal at the second frequency by offsetting the frequency of the first oscillating signal. The second oscillating signal is selectively provided to the frequency doubling circuit, and the second downconverter mixes the output of the third band selection filter with the output of the frequency doubling circuit when the second oscillating signal is provided to the frequency doubling circuit in order to downconvert signals modulated in accordance with the fourth modulation format from the third frequency range to the common intermediate frequency range.

In accordance with a further aspect, the receiver of the present invention includes one or more channel selection filters that are coupled to outputs of the first and second downconverters. The channel selection filter(s) function to filter the downconverted signals output by the first and second downconverters. A sampling circuit is coupled to an output of the channel selection filter(s). The sampling circuit selectively samples the downconverted signals with a sampling clock that alternatively samples signals at either a first or second sampling rate. The sampling clock is coupled to a third oscillating signal at a third frequency, and the third oscillating signal is an input to the mixer that forms the second oscillating signal at the second frequency. The first sampling rate provided by the sampling clock is equal to the third frequency divided by x, and the second sampling rate provided by the sampling clock is equal to the third frequency divided by y, wherein x and y are integers and, in one example, are equal to 3 and 15. This aspect invention minimizes excess hardware in the receiver, since the third oscillating signal at the third frequency is used both in the frequency downconversion process as well as in the sampling process. In one embodiment, the sampling circuit samples downconverted signals modulated in accordance with either the second, third or fourth modulation formats in accordance with the first sampling rate, and the sampling circuit samples downconverted signals modulated in accordance with the first modulation format in accordance with the second sampling rate.

In one embodiment, only a single channel selection filter is coupled to outputs of the first and second downconverters, and the single channel selection filter operates to filter downconverted signals modulated in accordance with the first and second modulation formats output by the first downconverter, and the single channel selection filter further filters downconverted signals modulated in accordance with the third and fourth modulation formats output by the second downconverter.

In a further embodiment, first and second channel selection filters are coupled to outputs of the first and second downconverters. The first channel selection filter operates to filter downconverted signals modulated in accordance with the first modulation format output by the first downconverter, the second channel selection filter operates to filter downconverted signals modulated in accordance with the second modulation format output by the first downconverter, the second channel filter also filters downconverted signals modulated in accordance with the third modulation format output by the second downconverter, and the second channel selection filter further filters downconverted signals modulated in accordance with the fourth modulation format output by the second downconverter.

In a still further embodiment, first, second and third channel selection filters are coupled to outputs of the first and second downconverters. The first channel selection filter operates to filter downconverted signals modulated in accordance with the first modulation format output by the first downconverter, the second channel selection filter operates to filter downconverted signals modulated in accordance with the second modulation format output by the first downconverter, the second channel filter also filters downconverted signals modulated in accordance with the third modulation format output by the second downconverter, and the third channel selection filter operates to filter downconverted signals modulated in accordance with the fourth modulation format output by the second downconverter.

In the above embodiments, two downconverters were coupled to outputs of the band selection filters. In a further embodiment, a third downconverter is coupled to an output of the first band selection filter, and also functions to downconvert signals from the first frequency range to the common intermediate frequency range. In this embodiment, the switching circuitry selectively couples one of either the first oscillating signal from the VCO or the second oscillating signal to inputs of the first and third downconverters and an input of the frequency doubling circuit. Whereas in the previous embodiments input signals modulated in accordance with the second modulation format were downconverted using the first downconverter, in this embodiment the third downconverter mixes the output of the first band selection filter with the first oscillating signal at the channel frequency associated with the second modulation format in order to downconvert signals modulated in accordance with the second modulation format from the first frequency range to the common intermediate frequency range. In this embodiment, one, two or three channel selection filters is/are alternatively coupled to outputs of the first, second and third downconverters, and the channel selection filter(s) operate to filter the downconverted signals modulated in accordance with the first, second, third and fourth modulation formats.

BRIEF DESCRIPTION OF THE DRAWINGS

The features, objects and advantages of the present invention will become more apparent from the detailed description set forth below when taken in conjunction with the drawings in which like reference characters identify corresponding elements and wherein.

DETAILED DESCRIPTION OF THE PREFERRED EMBODIMENTS

Figure 1:
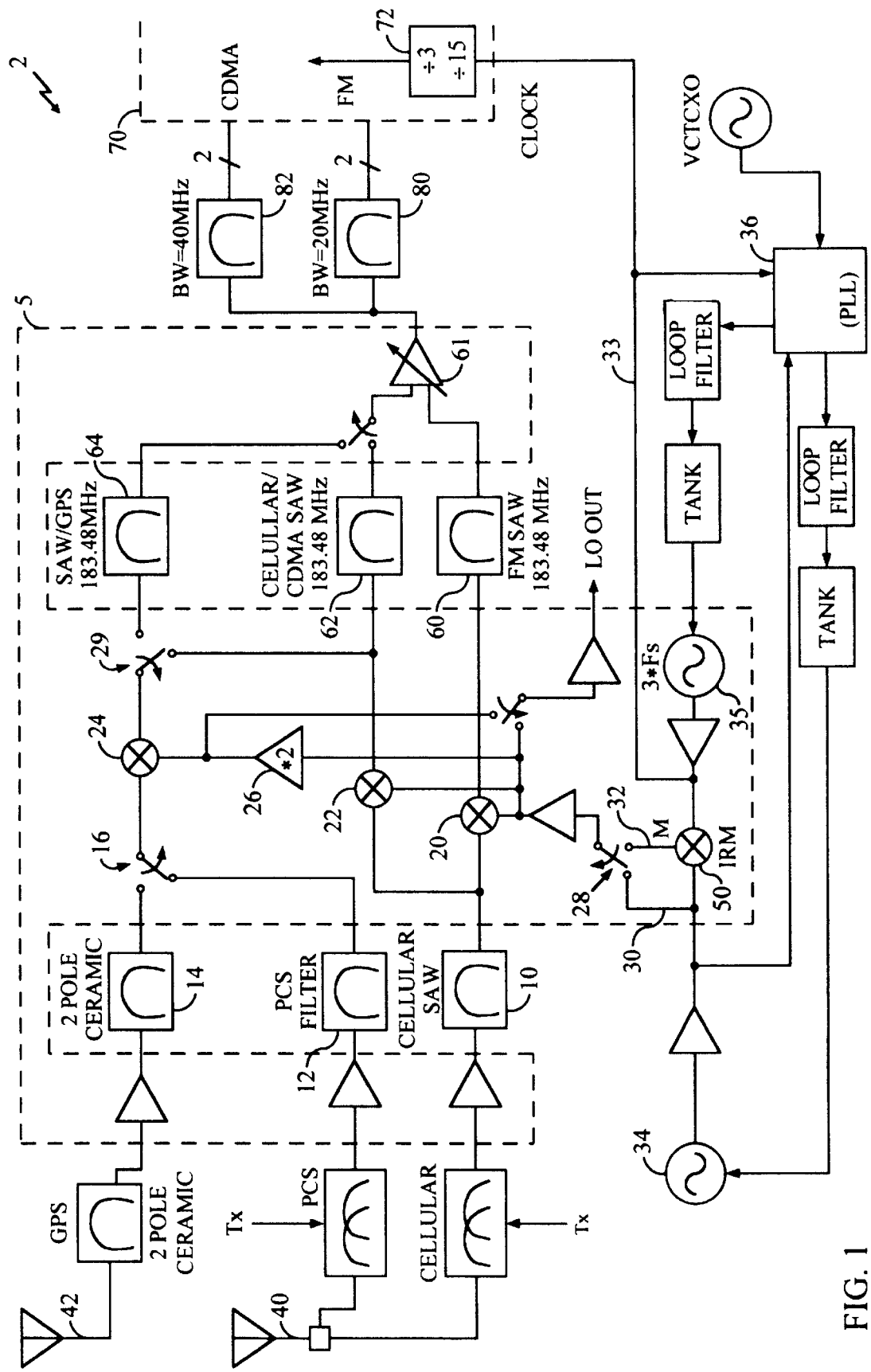
FIG. 1 is a block diagram of a receiver that downconverts signals transmitted at three different frequency ranges and modulated using first, second, third and fourth modulation formats to a common intermediate frequency range using three downconverters, in accordance with a preferred embodiment of the present invention. In the receiver of FIG. 1, three channel selection filters are used to process the downconverted signals output by the three downconverters.

Referring now to FIG. 1, there is shown a block diagram of a receiver 2 for use in a multi-mode mobile radio telephone that alternatively supports communications using any one of four different modulation formats. The receiver downconverts input signals modulated using one of first, second, third and fourth modulation formats to a common intermediate frequency range. In the embodiment shown, the first, second, third and fourth modulation formats correspond respectively to analog modulation, CDMA modulation, PCS modulation and GPS modulation, although it will be understood by those skilled in the art that the architecture of the present invention could be applied for downconverting signals modulated in accordance with other formats. The first and second modulation formats are transmitted to the receiver in a first frequency range, the third modulation format is transmitted to the receiver in a second frequency range, and the fourth modulation format is transmitted to the receiver in a third frequency range. In the embodiment shown, the first and second frequency ranges correspond to the frequency bands typically used for analog and CDMA cellular telephone transmissions, i.e., 869–894 MHz; the third frequency range corresponds to the frequency band typically used for PCS transmissions, i.e., 1930–1990 MHz; and the fourth frequency range corresponds to the frequency band typically used for GPS transmissions, i.e., a 2 MHz band centered at 1575.42 MHz.

Input signals received by the receiver are provided to a first band selection filter 10 that selects the first frequency range (e.g., the frequency range corresponding to the analog and CDMA bands), a second band selection filter 12 selects the second frequency range (e.g., the PCS band), and a third band selection filter 14 selects the third frequency range (e.g., the GPS band).

A downconverter (or mixer) 20 is coupled to an output of the first band selection filter 10, and downconverts signals modulated in accordance with the first modulation format (e.g., analog signals) output by the first band selection filter 10 from the first frequency range to the common intermediate frequency range. The common intermediate frequency range is centered at an IF center frequency which, in the preferred embodiment, is about 183.48 MHz. The downconverter 20 translates the output of the first band selection filter 10 (i.e., the entire analog frequency band) down the frequency spectrum to the intermediate frequency range such that the channel of interest (i.e., the channel in the analog frequency band to which the receiver is being tuned) is centered at the IF center frequency.

A second downconverter (or mixer) 22 is also coupled to an output of the first band selection filter 10, and downconverts signals modulated in accordance with the second modulation format (e.g., CDMA signals) output by the first band selection filter 10 from the first frequency range to the common intermediate frequency range. The downconverter 22 translates the output of the first band selection filter 10 (i.e., the entire CDMA frequency band) down the frequency spectrum to the intermediate frequency range such that the channel of interest (i.e., the channel in the CDMA frequency band to which the receiver is being tuned) is centered at the IF center frequency.

A third downconverter (or mixer) 24 is selectively coupled by a switch 16 to either an output of the second band selection filter 12 or an output of the third band selection filter 14. The third downconverter 24 functions to downconvert either (i) signals modulated in accordance with the third modulation format (e.g., PCS signals) output by the second band selection filter 12 from the second frequency range to the common intermediate frequency range, or (ii) signals modulated in accordance with the fourth modulation format (e.g., GPS signals) output by the third band selection filter 14 from the third frequency range to the common intermediate frequency range. Depending on the position of switch 16, the downconverter 24 either translates the output of the second band selection filter 12 (i.e., the entire PCS frequency band) down the frequency spectrum to the intermediate frequency range such that the channel of interest (i.e., the channel in the PCS frequency band to which the receiver is being tuned) is centered at the IF center frequency, or the downconverter 24 translates the output of the third band selection filter 14 (i.e., the entire GPS frequency band) down the frequency spectrum to the intermediate frequency range such that the channel of interest (i.e., the channel in the GPS frequency band to which the receiver is being tuned) is centered at the IF center frequency. When switch 16 couples the output of the second band selection filter 12 to the third downconverter 24, switch 29 couples the output of the third downconverter 24 to the second channel selection filter 62 (described below). Similarly, when switch 16 couples the output of the third band selection filter 14 to the third downconverter 24, switch 29 couples the output of the third downconverter 24 to the third channel selection filter 64 (also described below).

The third downconverter 24 has an input coupled to a frequency doubling circuit 26. Switching circuitry 28 selectively provides one of either a first oscillating signal 30 from a voltage controlled oscillator (VCO) 34 having a VCO frequency range or a second oscillating signal 32 at a second frequency that is outside the VCO frequency range to inputs of the first and second downconverters 20, 22 and to an input of the frequency doubling circuit 26. In the preferred embodiment, the frequency range of VCO 34 is 1052–1087 MHz.

The VCO 34 is responsive to control circuitry 36 that causes the VCO 34 to generate the first oscillating signal 30 at a frequency associated with an analog channel to which the receiver is being tuned when analog signals are being received at antenna 40 (i.e., when the mobile radio is operating in the analog mode.) When such signals are being received, the first downconverter 20 mixes the output of the first band selection filter 10 with the first oscillating signal 30 at the frequency associated with the analog channel to which the receiver is being tuned in order to downconvert analog signals from the first frequency range to the common intermediate frequency range. In the downconverted signal, the channel of interest (i.e., the analog channel to which the receiver is being tuned) is centered at the IF center frequency.

The control circuitry 36 further causes the VCO 34 to generate the first oscillating signal 30 at a frequency associated with a CDMA channel to which the receiver is being tuned when CDMA signals are being received at antenna 40 (i.e., when the mobile radio unit is operating in the CDMA mode.) When such signals are being received, the second downconverter 22 mixes the output of the first band selection filter 10 with the first oscillating signal 30 at the frequency associated with the CDMA channel to which the receiver is being tuned in order to downconvert analog signals from the first frequency range to the common intermediate frequency range. In the downconverted signal, the channel of interest (i.e., the CDMA channel to which the receiver is being tuned) is centered at the IF center frequency.

The control circuitry 36 further causes the VCO 34 to generate the first oscillating signal 30 at a frequency associated with a PCS channel to which the receiver is being tuned when PCS signals are being received at antenna 40 (i.e., when the mobile radio unit is operating in the PCS mode.) When such signals are being received, the first oscillating signal 30 at a frequency associated with a PCS channel to which the receiver is being tuned is provided to the frequency doubling circuit 26, and the third downconverter 24 mixes the output of the second band selection filter 14 with an output of the frequency doubling circuit 26 in order to downconvert PCS signals from the second frequency range to the common intermediate frequency range. In the downconverted signal, the channel of interest (i.e., the PCS channel to which the receiver is being tuned) is centered at the IF center frequency.

In a preferred embodiment, when the receiver is operating in either the analog or CDMA modes, the first oscillating signal 30 provided by the VCO 34 is within a frequency range of 1052.52–1077.45 MHz. This frequency range allows the downconverters 20, 22 to downconvert any channel of interest in either the analog or CDMA band to the IF center frequency. Similarly, in the preferred embodiment, when the receiver is operating in the PCS mode, the first oscillating signal 30 provided by the VCO 34 is within a frequency range of 1056.74–1086.74 MHz. This frequency range allows the downconverter 24 to downconvert any channel of interest in the PCS band to the IF center frequency.

When the mobile radio unit is operating in the GPS mode and GPS signals are received at antenna 42, a mixer 50 forms the second oscillating signal 32 at a frequency that is outside the frequency range of VCO 34 by offsetting the frequency of the first oscillating signal 30. This frequency offsetting may be performed using, for example, an image reject mixer (IRM) 50. The frequency of the second oscillating signal 32 is associated with a GPS channel to which the receiver is being tuned. When the mobile radio unit is operating in the GPS mode, the second oscillating signal 32 at a frequency associated with a GPS channel to which the receiver is being tuned is provided to the frequency doubling circuit 26, and the third downconverter 24 mixes the output of the third band selection filter 14 with an output of the frequency doubling circuit 26 in order to downconvert GPS signals from the third frequency range to the common intermediate frequency range. In the downconverted signal, the channel of interest (i.e., the GPS channel to which the receiver is being tuned) is centered at the IF center frequency.

In the preferred embodiment, when the receiver is operating in the GPS mode, the second oscillating signal 32 provided to doubling circuit 26 is within a frequency range that is centered about 879.45 MHz. This frequency range allows the downconverter 24 to downconvert any channel of interest in the GPS band to the IF center frequency.

As mentioned above, the mixer 50 forms the second oscillating signal 32 at a frequency that is outside the frequency range of VCO 34 by offsetting the frequency of the first oscillating signal 30. In the preferred embodiment, this frequency offsetting is performed by mixing the output of the VCO 34 with a signal 33 generated by oscillator 35. Signal 33 has a frequency that is equal to three times a sampling frequency ($F_s$). The sampling frequency ($F_s$) associated with oscillator 35 is preferably selected such that the sampling frequency and the center IF frequency ($f_{IF}$) discussed above are related in accordance with equation (1) below:

$$f_{IF}=[(2k+1)/4]*(F_s), \text{ where } k=0,1,2 \qquad (1)$$

The receiver of the FIG. 1 also preferably includes a plurality of channel selection filters 60, 62, 64 for selecting or tuning to specified channels associated with each of the four modulation formats. The channel selection filters 60, 62, 64 are coupled to outputs of the first, second and third downconverters, and filter the downconverted signals output by the first, second and third downconverters. A sampling circuit 70 is coupled to an output of the channel selection filters by anti-alias filters 80, 82. The sampling circuit 70 selectively samples the downconverted signals with a sampling clock 72 that alternatively samples signals at either a first or second sampling rate. The sampling clock 72 is coupled to signal 33 which, as mentioned above, is also provided as an input to the mixer 50 that forms the second oscillating signal 32 The first sampling rate provided by the sampling clock is preferably equal to $3*F_s$ (i.e., the frequency of signal 33) divided by 3, and the second sampling rate provided by the sampling clock is preferably equal to $(3*F_s)$ divided by 15. These two sampling rates allow the receiver of the present invention to sample either analog, CDMA, PCS or GPS signals using a common sampling circuit 70. In particular, the present invention uses the first sampling rate to sample CDMA, PCS and GPS signals, and the second sampling rate to sample analog signals. This aspect of the invention minimizes excess hardware in the receiver, since the oscillating signal 33 is used both in the frequency downconversion process as well as in the sampling process.

Also in the preferred embodiment, a radio frequency integrated circuit chip is preferably used to implement all the components positioned within dotted line 5.

Figure 2:
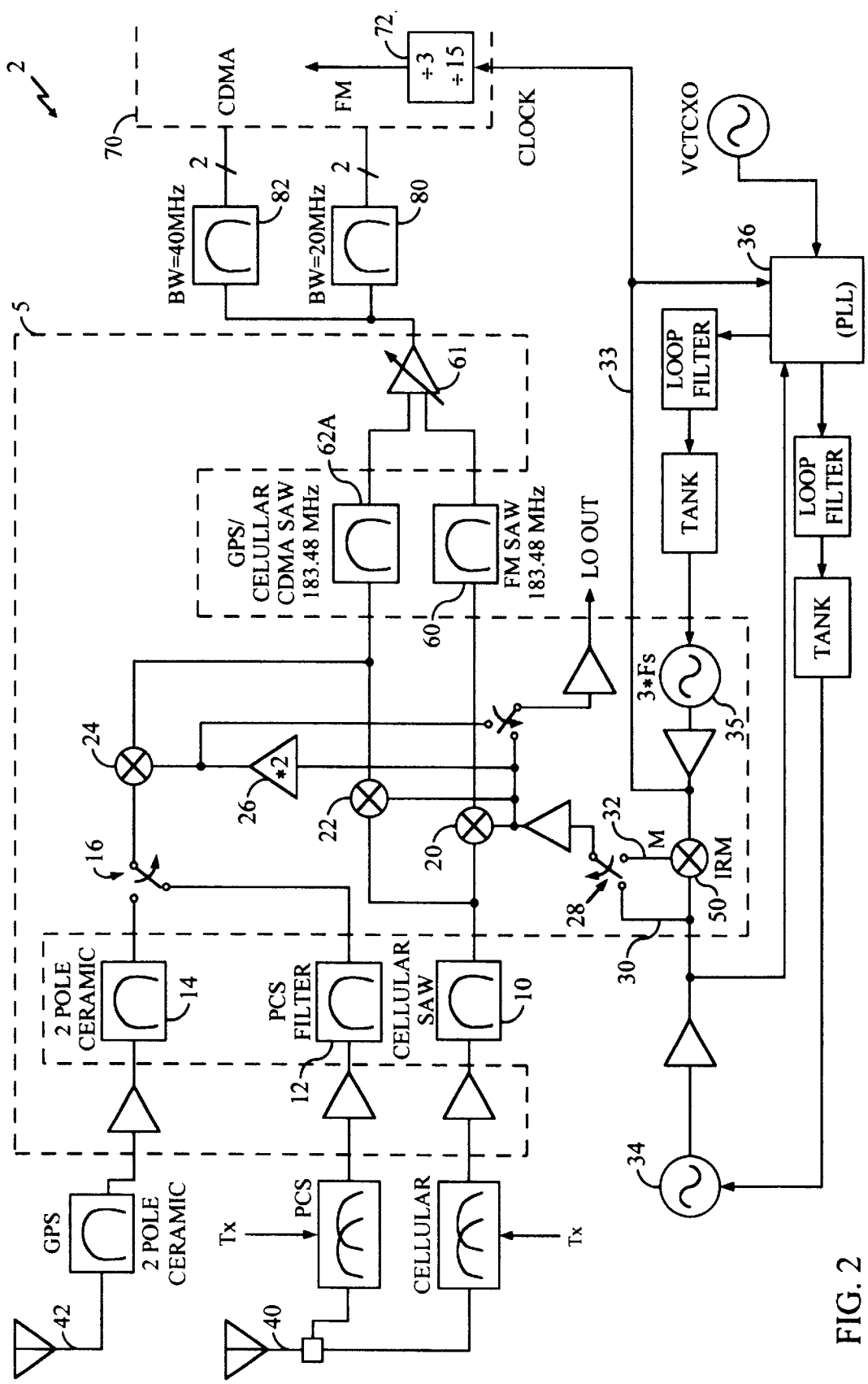
FIG. 2 is a block diagram of a receiver that downconverts signals transmitted at three different frequency ranges and modulated using first, second, third and fourth modulation formats to a common intermediate frequency range using three downconverters, in accordance with an alternative preferred embodiment of the present invention. In the receiver of FIG. 2, two channel selection filters are used to process the downconverted signals output by the three downconverters.

Referring now to FIG. 2, there is shown a block diagram of a receiver that downconverts signals modulated using first, second, third and fourth modulation formats to a common intermediate frequency range using three downconverters, in accordance with an alternative preferred embodiment of the present invention. The receiver shown in FIG. 2 is substantially the same as the receiver of FIG. 1, except in the receiver of FIG. 2 only two channel selection filters 60, 62A are used to process the downconverted signals output by the three downconverters. Thus, in the receiver of FIG. 2, the second channel selection filter 62A filters downconverted signals modulated in accordance with the second modulation format (e.g., CDMA signals) output by the second downconverter 22, the second channel filter 62A also filters downconverted signals modulated in accordance with the third modulation format (e.g., PCS signals) output by the third downconverter 24, and the second channel selection filter 62A further filters downconverted signals modulated in accordance with the fourth modulation format (e.g., GPS signals) output by the third downconverter 24.

Figure 3:
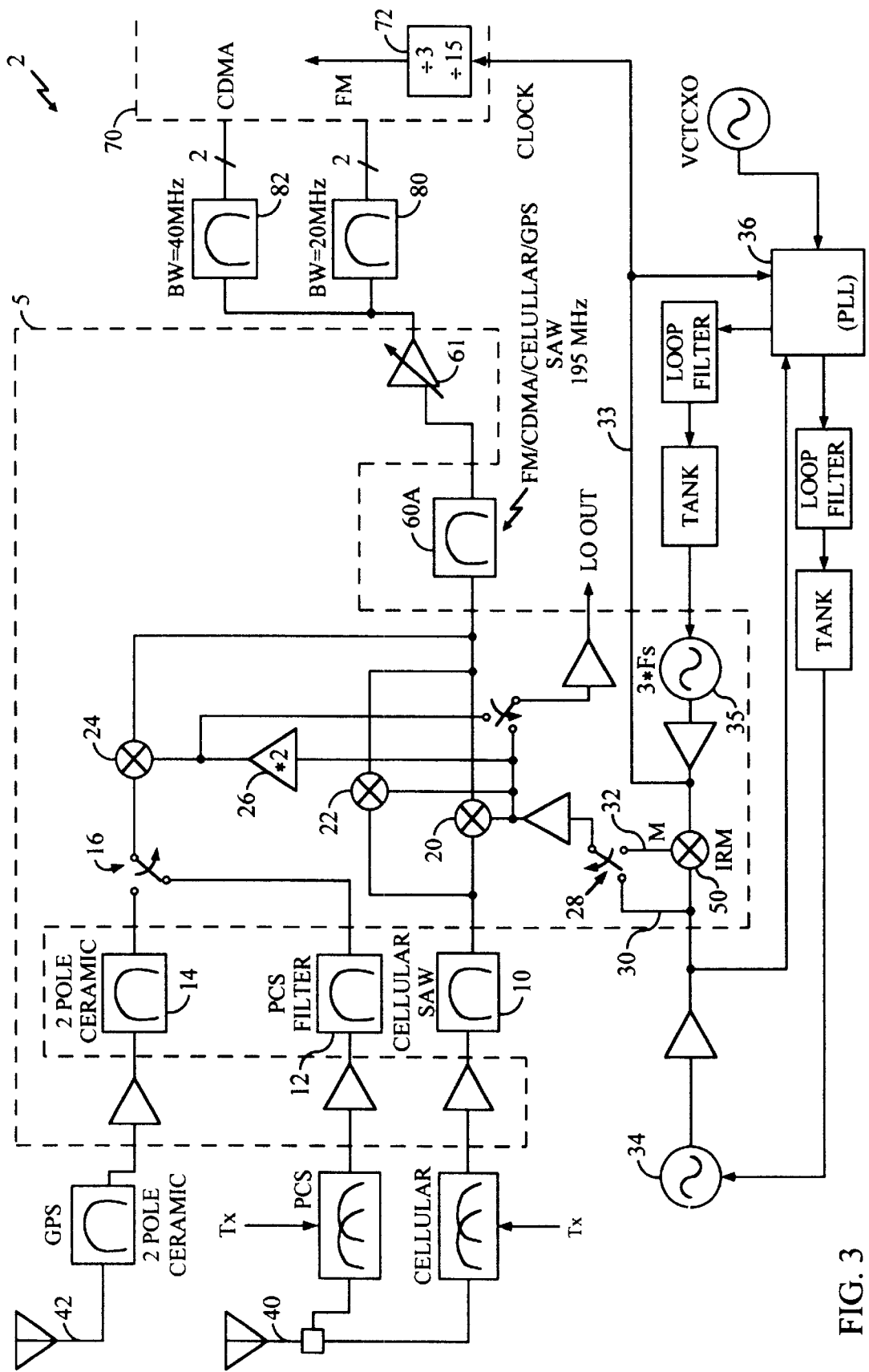
FIG. 3 is a block diagram of a receiver that downconverts signals transmitted at three different frequency ranges and modulated using first, second, third and fourth modulation formats to a common intermediate frequency range using three downconverters, in accordance with a still further preferred embodiment of the present invention. In the receiver of FIG. 3, a single channel selection filter is used to process the downconverted signals output by the three downconverters.

Referring now to FIG. 3, there is shown a block diagram of a receiver that downconverts signals modulated using first, second, third and fourth modulation formats to a common intermediate frequency range using three downconverters, in accordance with a further alternative preferred embodiment of the present invention. The receiver shown in FIG. 3 is substantially the same as the receiver of FIG. 1, except in the receiver of FIG. 3 only a single channel selection filter 60A is used to process the downconverted signals output by the three downconverters.

Figure 4:
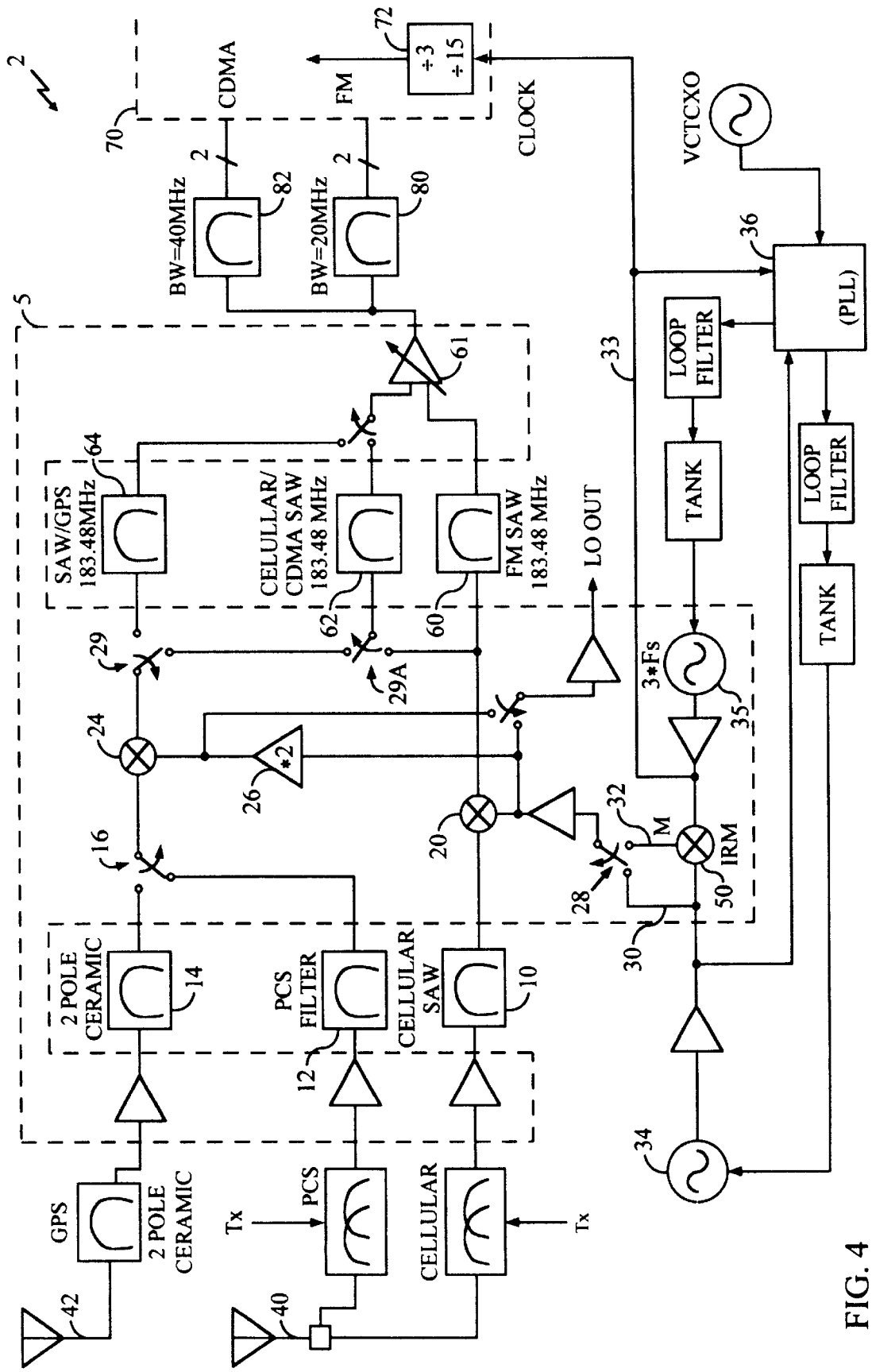
FIG. 4 is a block diagram of a receiver that downconverts signals transmitted at three different frequency ranges and modulated using first, second, third and fourth modulation formats to a common intermediate frequency range using two downconverters, in accordance with a preferred embodiment of the present invention. In the receiver of FIG. 4, three channel selection filters are used to process the downconverted signals output by the two downconverters.

FIG. 4 is a block diagram of a receiver that downconverts signals modulated using first, second, third and fourth modulation formats to a common intermediate frequency, in accordance with a preferred embodiment of the present invention. In contrast to the receiver of FIGS. 1–3, in the receiver of FIG. 4 only two downconverters 20, 24 are used to perform the frequency downconversions for all four operating modes. Thus, in FIG. 4, only downconverter 20 is coupled to an output of the first band selection filter 10. Downconverter 20 downconverts signals modulated in accordance with either the first modulation format (e.g., analog signals) or the second modulation format (e.g., CDMA signals) output by the first band selection filter 10 from the first frequency range to the common intermediate frequency range. In this embodiment, the downconverter 20 translates the output of the first band selection filter 10 (i.e., either the entire analog or CDMA frequency band) down the frequency spectrum to the intermediate frequency range such that the channel of interest (i.e., the channel in the analog or CDMA frequency band to which the receiver is being tuned) is centered at the IF center frequency. The remaining components of the receiver of FIG. 4 function substantially the same as the corresponding components described above in connection with FIG. 1, except in FIG. 4 the first oscillating signal 30 that was previously provided to mixer 22 in FIG. 1 is provided instead to mixer 20 in FIG. 4 when the receiver is operating in the CDMA mode. In addition, in the embodiment of FIG. 4, a further switch 29A is provided for directing the output of mixer 20 to the second channel selection filter 62 when the receiver is operating in the CDMA mode.

Figure 5:
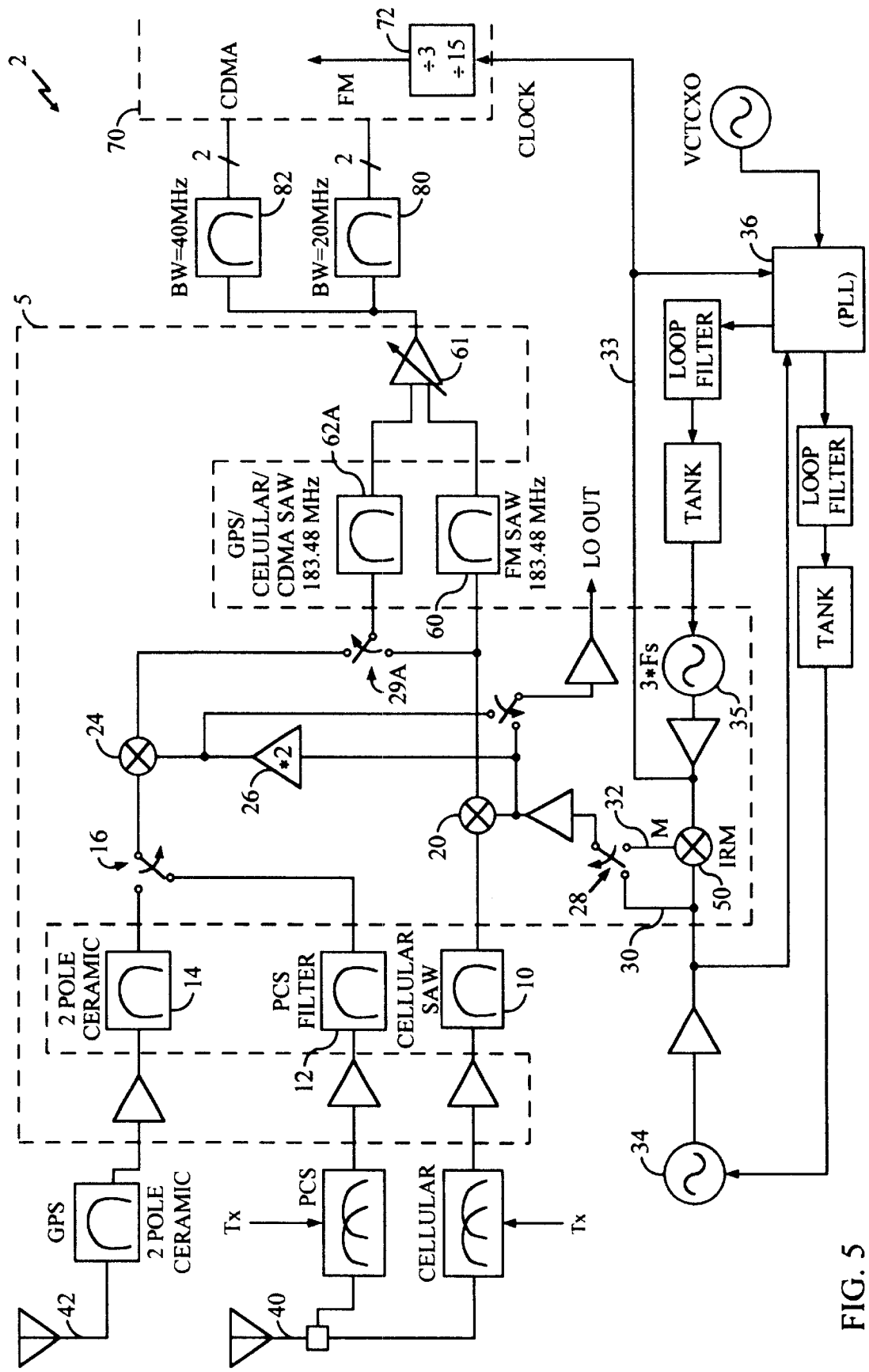
FIG. 5 is a block diagram of a receiver that downconverts signals transmitted at three different frequency ranges and modulated using first, second, third and fourth modulation formats to a common intermediate frequency range using two downconverters, in accordance with a further alternative preferred embodiment of the present invention. In the receiver of FIG. 5, two channel selection filters are used to process the downconverted signals output by the two downconverters.

Referring now to FIG. 5, there is shown a block diagram of a receiver that downconverts signals modulated using first, second, third and fourth modulation formats to a common intermediate frequency range using two downconverters, in accordance with an alternative preferred embodiment of the present invention. The receiver shown in FIG. 5 is substantially the same as the receiver of FIG. 4, except in the receiver of FIG. 5 only two channel selection filters 60, 62A are used to process the downconverted signals output by the two downconverters. Thus, in the receiver of FIG. 5, the second channel selection filter 62A filters downconverted signals modulated in accordance with the second modulation format (e.g., CDMA signals) output by downconverter 20, the second channel filter 62A also filters downconverted signals modulated in accordance with the third modulation format (e.g., PCS signals) output by the downconverter 24, and the second channel selection filter 62A further filters downconverted signals modulated in accordance with the fourth modulation format (e.g., GPS signals) output by downconverter 24.

Figure 6:
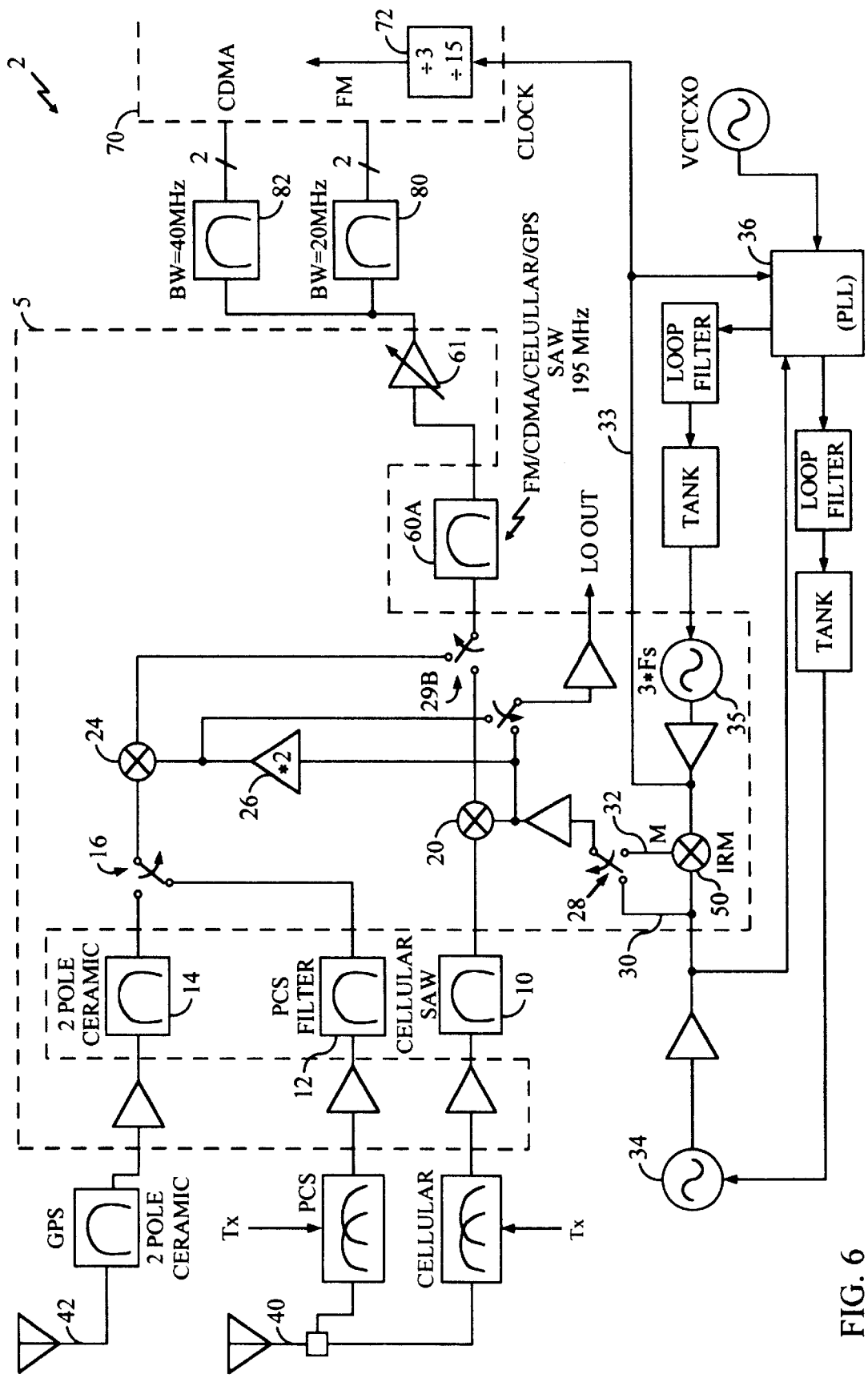
FIG. 6 is a block diagram of a receiver that downconverts signals transmitted at three different frequency ranges and modulated using first, second, third and fourth modulation formats to a common intermediate frequency range using two downconverters, in accordance with a still further preferred embodiment of the present invention. In the receiver of FIG. 6, a single channel selection filter is used to process the downconverted signals output by the two downconverters.

Referring now to FIG. 6, there is shown a block diagram of a receiver that downconverts signals modulated using first, second, third and fourth modulation formats to a common intermediate frequency range using two downconverters, in accordance with a further alternative preferred embodiment of the present invention. The receiver shown in FIG. 6 is substantially the same as the receiver of FIG. 4, except in the receiver of FIG. 6 only a single channel selection filter 60A is used to process the downconverted signals output by the two downconverters.

The previous description of the preferred embodiments is provided to enable any person skilled in the art to make or use the present invention. Although the present invention has been described in conjunction with a mobile radio telephone receiver, the principles of the present invention may be applied in other contexts and applications. In addition, various modifications to the embodiments described above will be readily apparent to those skilled in the art, and the generic principles defined herein may be applied to other embodiments without the use of inventive faculty. Thus, the present invention is not intended to be limited to the methods and apparatuses shown herein but is to be accorded the widest scope consistent with the claims set forth below.

What is claimed is:

1. A receiver that downconverts signals modulated using a plurality of modulation formats to a common intermediate frequency range, comprising:

a first band selection filter that selects a first frequency range;

a second band selection filter that selects a second frequency range;

a third band selection filter that selects a third frequency range;

a first downconverter, coupled to an output of the first band selection filter, that downconverts signals from the first frequency range to the common intermediate frequency range;

a second downconverter, selectively coupled by a switch to either an output of the second band selection filter or an output of the third band selection filter, that downconverts signals from either the second frequency range or the third frequency range to the common intermediate frequency range, wherein the second downconverter has an input coupled to a frequency doubling circuit;

switching circuitry that selectively couples one of either a first oscillating signal from a voltage controller oscillator (VCO) having a VCO frequency range or a second oscillating signal at a second frequency that is outside the VCO frequency range to an input of the first downconverter and an input of the frequency doubling circuit.

2. The receiver of claim 1, wherein the plurality of modulation formats include first, second, third and fourth modulation formats, the first and second modulation formats are transmitted to the receiver in the first frequency range, the third modulation format is transmitted to the receiver in the second frequency range, and the fourth modulation format is transmitted to the receiver in the third frequency range.

3. The receiver of claim 2, wherein the VCO is responsive to control circuitry and selectively generates the first oscillating signal at a channel frequency associated with the first modulation format, and the first downconverter mixes the output of the first band selection filter with the first oscillating signal at the channel frequency associated with the first modulation format in order to downconvert signals modulated in accordance with the first modulation format from the first frequency range to the common intermediate frequency range.

4. The receiver of claim 3, wherein the VCO further selectively generates the first oscillating signal at a channel frequency associated with the second modulation format, and the first downconverter mixes the output of the first band selection filter with the first oscillating signal at the channel frequency associated with the second modulation format in order to downconvert signals modulated in accordance with the second modulation format from the first frequency range to the common intermediate frequency range.

5. The receiver of claim 4, wherein the VCO further selectively generates the first oscillating signal at a channel frequency associated with the third modulation format, wherein the first oscillating signal at the channel frequency associated with the third modulation format is provided to the frequency doubling circuit, and the second downconverter mixes the output of the second band selection filter with an output of the frequency doubling circuit when the first oscillating signal at a channel frequency associated with the third modulation format is provided to the frequency doubling circuit in order to downconvert signals modulated in accordance with the third modulation format from the second frequency range to the common intermediate frequency range.

6. The receiver of claim 5, further comprising a mixer that forms the second oscillating signal at the second frequency by offsetting the frequency of the first oscillating signal.

7. The receiver of claim 6, wherein the second oscillating signal is selectively provided to the frequency doubling circuit, and the second downconverter mixes the output of the third band selection filter with the output of the frequency doubling circuit when the second oscillating signal is provided to the frequency doubling circuit in order to downconvert signals modulated in accordance with the fourth modulation format from the third frequency range to the common intermediate frequency range.

8. The receiver of claim 7, wherein the first modulation format corresponds to analog modulation, the second modulation format corresponds to CDMA modulation, the third modulation format corresponds to PCS modulation, the fourth modulation format corresponds to GPS modulation, the first frequency range is 869–894 MHz, the second frequency range is 1930–1990 MHz, and the third frequency range is 1574.42–1576.42 MHz.

9. The receiver of claim 8, wherein the common intermediate frequency range is centered about 183.48 MHz.

10. The receiver of claim 8, wherein the first oscillating signal at a channel frequency associated with the first modulation format has a frequency range of 1052.52–1077.45 MHz.

11. The receiver of claim 10, wherein the first oscillating signal at a channel frequency associated with the second modulation format has a frequency range of 1052.52–1077.45 MHz.

12. The receiver of claim 11, wherein the first oscillating signal at a channel frequency associated with the third modulation format has a frequency range of 1056.74–1086.74 MHz.

13. The receiver of claim 12, wherein the second oscillating signal at a channel frequency associated with the fourth modulation format has a frequency range centered at 879.45 MHz.

14. The receiver of claim 6, further comprising:
one or more channel selection filters, coupled to outputs of the first and second downconverters, that filter the downconverted signals output by the first and second downconverters;
a sampling circuit, coupled to an output of the one or more channel selection filters, that selectively samples the downconverted signals with a sampling clock that alternatively samples signals at either a first or second sampling rate; and
wherein the sampling dock is coupled to a third oscillating signal at a third frequency, and the third oscillating signal is an input to the mixer that forms the second oscillating signal at the second frequency.

15. The receiver of claim 14, wherein the first sampling rate provided by the sampling dock is equal to the third frequency divided by x, and the second sampling rate provided by the sampling clock is equal to the third frequency divided by y, wherein x and y are integers.

16. The receiver of claim 15, wherein the first sampling rate provided by the sampling clock is ⅓ the third frequency, and the second sampling rate provided by the sampling clock is one-fifteenth of the third frequency.

17. The receiver of claim 15, wherein the sampling circuit samples downconverted signals modulated in accordance with either the second, third or fourth modulation formats in accordance with the first sampling rate, and the sampling circuit samples downconverted signals modulated in accordance with the first modulation format in accordance with the second sampling rate.

18. The receiver of claim 17, wherein the one or more channel selection filters include only a single channel selection filter.

19. The receiver of claim 17, wherein the one or more channel selection filters include first and second channel selection filters, the first channel selection filter filters downconverted signals modulated in accordance with the first modulation format output by the first downconverter, the second channel selection filter filters downconverted signals modulated in accordance with the second modulation format output by the first downconverter, the second channel filter also filters downconverted signals modulated in accordance with the third modulation format output by the second downconverter, and the second channel selection filter further filters downconverted signals modulated in accordance with the fourth modulation format output by the second downconverter.

20. The receiver of claim 17, wherein the one or more channel selection filters include first, second and third channel selection filters, the first channel selection filter filters downconverted signals modulated in accordance with the first modulation format output by the first downconverter, the second channel selection filter filters downconverted signals modulated in accordance with the second modulation format output by the first downconverter, the second channel filter also filters downconverted signals modulated in accordance with the third modulation format output by the second downconverter, and the third channel selection filter filters downconverted signals modulated in accordance with the fourth modulation format output by the second downconverter.

21. The receiver of claim 14, further comprising a plurality of anti-alias filters coupled to the output of the one or more channel selection filters and to an input of the sampling circuit.

22. The receiver of claim 1, further comprising:
a third downconverter, coupled to an output of the first band selection filter, that downconverts signals from the first frequency range to the common intermediate frequency range;
wherein the switching circuitry selectively couples one of either the first oscillating signal from the VCO or the second oscillating signal to inputs of the first and third downconverters and an input of the frequency doubling circuit.

23. The method of claim 22, wherein the plurality of modulation formats include first, second, third and fourth modulation formats, the first and second modulation formats are transmitted to the receiver in the first frequency range, the third modulation format is transmitted to the receiver in the second frequency range, and the fourth modulation format is transmitted to the receiver in the third frequency range.

24. The receiver of claim 23, wherein the VCO is responsive to control circuitry and selectively generates the first oscillating signal at a channel frequency associated with the first modulation format, and the first downconverter mixes the output of the first band selection filter with the first oscillating signal at the channel frequency associated with the first modulation format in order to downconvert signals modulated in accordance with the first modulation format from the first frequency range to the common intermediate frequency range.

25. The receiver of claim 24, wherein the VCO further selectively generates the first oscillating signal at a channel frequency associated with the second modulation format, and the third downconverter mixes the output of the first band selection filter with the first oscillating signal at the channel frequency associated with the second modulation format in order to downconvert signals modulated in accordance with the second modulation format from the first frequency range to the common intermediate frequency range.

26. The receiver of claim 25, wherein the VCO further selectively generates the first oscillating signal at a channel frequency associated with the third modulation format, wherein the first oscillating signal at the channel frequency associated with the third modulation format is provided to the frequency doubling circuit, and the second downconverter mixes the output of the second band selection filter with an output of the frequency doubling circuit when the first oscillating signal at a channel frequency associated with the third modulation format is provided to the frequency doubling circuit in order to downconvert signals modulated in accordance with the third modulation format from the second frequency range to the common intermediate frequency range.

27. The receiver of claim 26, further comprising a mixer that forms the second oscillating signal at the second frequency by offsetting the frequency of the first oscillating signal.

28. The receiver of claim 27, wherein the second oscillating signal is selectively provided to the frequency doubling circuit, and the second downconverter mixes the output of the third band selection filter with the output of the frequency doubling circuit when the second oscillating signal is provided to the frequency doubling circuit in order to downconvert signals modulated in accordance with the fourth modulation format from the third frequency range to the common intermediate frequency range.

29. The receiver of claim 28, wherein the first modulation format corresponds to analog modulation, the second modulation format corresponds to CDMA modulation, the third modulation format corresponds to PCS modulation, the fourth modulation format corresponds to GPS modulation, the first frequency range is 869–894 MHz, the second frequency range is 1930–1990 MHz, and the third frequency range is 1574.42–1576.42 MHz.

30. The receiver of claim 29, wherein the common intermediate frequency range is centered about 183.48 MHz.

31. The receiver of claim 29, wherein the first oscillating signal at a channel frequency associated with the first modulation format has a frequency range of 1052.52–1077.45 MHz.

32. The receiver of claim 31, wherein the first oscillating signal at a channel frequency associated with the second modulation format has a frequency range of 1052.52–1077.45 MHz.

33. The receiver of claim 32, wherein the first oscillating signal at a channel frequency associated with the third modulation format has a frequency range of 1056.74–1086.74 MHz.

34. The receiver of claim 33, wherein the second oscillating signal at a channel frequency associated with the fourth modulation format has a frequency range centered at 879.45 MHz.

35. The receiver of claim 27, further comprising:
one or more channel selection filters, coupled to outputs of the first, second and third downconverters, that filter the downconverted signals output by the first, second and third downconverters;
a sampling circuit, coupled to an output of the one or more channel selection filters, that selectively samples the downconverted signals with a sampling clock that alternatively samples signals at either a first or second sampling rate; and
wherein the sampling clock is coupled to a third oscillating signal at a third frequency, and the third oscillating signal is an input to the mixer that forms the second oscillating signal at the second frequency.

36. The receiver of claim 35, wherein the first sampling rate provided by the sampling clock is equal to the third frequency divided by x, and the second sampling rate provided by the sampling clock is equal to the third frequency divided by y, wherein x and y are integers.

37. The receiver of claim 36, wherein the first sampling rate provided by the sampling clock is ⅓ the third frequency, and the second sampling rate provided by the sampling clock is one-fifteenth of the third frequency.

38. The receiver of claim 36, wherein the sampling circuit samples downconverted signals modulated in accordance with either the second, third or fourth modulation formats in accordance with the first sampling rate, and the sampling circuit samples downconverted signals modulated in accordance with either the first modulation format in accordance with the second sampling rate.

39. The receiver of claim 38, wherein the one or more channel selection filters include only a single channel selection filter.

40. The receiver of claim 38, wherein the one or more channel selection filters include first and second channel selection filters, the first channel selection filter filters downconverted signals modulated in accordance with the first modulation format output by the first downconverter, the second channel selection filter filters downconverted signals modulated in accordance with the second modulation format output by the third downconverter, the second channel filter also filters downconverted signals modulated in accordance with the third modulation format output by the second downconverter, and the second channel selection filter further filters downconverted signals modulated in accordance with the fourth modulation format output by the second downconverter.

41. The receiver of claim 38, wherein the one or more channel selection filters include first, second and third channel selection filters, the first channel selection filter filters downconverted signals modulated in accordance with the first modulation format output by the first downconverter, the second channel selection filter filters downconverted signals modulated in accordance with the second modulation format output by the third downconverter, the second channel filter also filters downconverted signals modulated in accordance with the third modulation format output by the second downconverter, and the third channel selection filter filters downconverted signals modulated in accordance with the fourth modulation format output by the second downconverter.

42. The receiver of claim 35, further comprising a plurality of anti-alias filters coupled to the output of the one or more channel selection filters and to an input of the sampling circuit.

43. A method for downconverting signals modulated using a plurality of modulation formats to a common intermediate frequency range, comprising the steps of:
applying the input signals to a first band selection filter that selects a first frequency range;
applying the input signals to a second band selection filter that selects a second frequency range;
applying the input signals to a third band selection filter that selects a third frequency range;
selectively providing one of either a first oscillating signal from a voltage controller oscillator (VCO) having a VCO frequency range or a second oscillating signal at a second frequency that is outside the VCO frequency range to an input of a first downconverter and an input of a frequency doubling circuit;

downconverting, with the first downconverter, signals from the first frequency range to the common intermediate frequency range;

downconverting, with a second downconverter, signals from either the second frequency range or the third frequency range to the common intermediate frequency range, wherein the second downconverter has an input coupled to the frequency doubling circuit, and the second downconverter is selectively coupled by a switch to either an output of the second band selection filter or an output of the third band selection filter.

44. An apparatus for downconverting signals modulated using a plurality of modulation formats to a common intermediate frequency range, comprising:

means for applying the input signals to a first band selection filter that selects a first frequency range;

means for applying the input signals to a second band selection filter that selects a second frequency range;

means for applying the input signals to a third band selection filter that selects a third frequency range;

means for selectively providing one of either a first oscillating signal from a voltage controller oscillator (VCO) having a VCO frequency range or a second oscillating signal at a second frequency that is outside the VCO frequency range to an input of a first downconverter and an input of a frequency doubling circuit;

means for downconverting, with the first downconverter, signals from the first frequency range to the common intermediate frequency range;

means for downconverting, with a second downconverter, signals from either the second frequency range or the third frequency range to the common intermediate frequency range, wherein the second downconverter has an input coupled to the frequency doubling circuit, and the second downconverter is selectively coupled by a switch to either an output of the second band selection filter or an output of the third band selection filter.

* * * * *